United States Patent [19]
Fix, Jr.

[11] Patent Number: 6,095,395
[45] Date of Patent: Aug. 1, 2000

[54] FRICTION WELDING DRILL AND FUSE FITTING APPARATUS

[75] Inventor: John William Fix, Jr., Palm City, Fla.

[73] Assignee: The Fusion Bonding Corporation

[21] Appl. No.: 08/870,586

[22] Filed: Jun. 6, 1997

Related U.S. Application Data

[60] Provisional application No. 60/016,086, Jun. 19, 1996.

[51] Int. Cl.[7] .......................... B23K 20/12; F16K 43/00
[52] U.S. Cl. ...................... 228/2.3; 228/114.5; 137/318
[58] Field of Search ............... 228/2.1, 2.3, 114.5, 228/112.1; 408/224, 225, 79, 80, 67, 92; 137/15, 318

[56] References Cited

U.S. PATENT DOCUMENTS

| | | |
|---|---|---|
| 277,966 | 5/1883 | Whiteside . |
| 3,444,611 | 5/1969 | Bogart . |
| 3,452,914 | 7/1969 | Oberle et al. . |
| 3,504,425 | 4/1970 | Sutovsky et al. . |
| 3,576,067 | 4/1971 | Loyd et al. . |
| 3,609,854 | 10/1971 | Hasui . |
| 3,633,599 | 1/1972 | Roos .......................................... 137/15 |
| 3,678,566 | 7/1972 | Ellis et al. . |
| 3,694,896 | 10/1972 | Loyd . |
| 3,756,261 | 9/1973 | Minchhoff ................................. 137/15 |
| 3,777,360 | 12/1973 | Welch . |
| 3,827,138 | 8/1974 | Needham et al. . |
| 3,853,258 | 12/1974 | Louw et al. . |
| 3,897,896 | 8/1975 | Louw et al. ................................. 228/2 |
| 3,968,553 | 7/1976 | Tachikawa ........................... 29/157.1 R |
| 3,973,715 | 8/1976 | Rust . |
| 3,995,655 | 12/1976 | Sands ...................................... 137/318 |
| 4,046,013 | 9/1977 | Green ..................................... 73/422 R |
| 4,058,421 | 11/1977 | Summo . |
| 4,063,676 | 12/1977 | Lilly . |
| 4,258,742 | 3/1981 | Louthan et al. ......................... 137/318 |
| 4,580,933 | 4/1986 | Wilkins . |
| 4,619,473 | 10/1986 | Someya ................................... 285/353 |
| 4,830,000 | 5/1989 | Shutt . |
| 4,850,772 | 7/1989 | Jenkins . |
| 4,869,625 | 9/1989 | Stone . |
| 4,997,322 | 3/1991 | Wells et al. . |
| 5,054,980 | 10/1991 | Bidefeld . |
| 5,062,439 | 11/1991 | Butler et al. .............................. 137/15 |
| 5,345,964 | 9/1994 | Friedel .................................... 137/318 |
| 5,374,270 | 12/1994 | McGuire et al. . |
| 5,460,317 | 10/1995 | Thomas et al. . |
| 5,482,329 | 1/1996 | McCall et al. . |
| 5,482,410 | 1/1996 | Chambers ................................... 408/1 |
| 5,558,265 | 9/1996 | Fix, Jr. ..................................... 228/2.3 |
| 5,577,529 | 11/1996 | Katz ........................................ 137/318 |
| 5,694,972 | 12/1997 | King ........................................ 137/318 |
| 5,699,952 | 12/1997 | Fix, Jr. ..................................... 228/102 |
| 5,709,416 | 1/1998 | Wood . |
| 5,718,366 | 2/1998 | Colligan ................................. 228/112.1 |
| 5,785,805 | 6/1998 | Fix, Jr. ..................................... 156/580 |

FOREIGN PATENT DOCUMENTS

| | | | |
|---|---|---|---|
| 497444 | 7/1926 | Germany ................................. 408/225 |
| 870902 | 6/1961 | United Kingdom ................... 408/225 |

OTHER PUBLICATIONS

Welding Handbook, Eighth Edition, vol. I, Welding Technology; American Welding Society, 1987, pp. 19–20, 41,547–548.

Welding Handbook, Eighth Edition, vol. II, Welding Processes, American Welding Socity, 1991, pp. 740–761.

*Primary Examiner*—Patrick Ryan
*Assistant Examiner*—Kiley Stoner
*Attorney, Agent, or Firm*—Sankey & Luck, L.L.P.

[57] ABSTRACT

A friction welder drill and fuse fitting apparatus. This invention relates generally to a friction welder fitting apparatus and method for combining the operation of drilling a hole into a substrate workpiece and fusing a friction welding fitting onto that substrate in one set-up operation. The friction welding fitting (stud, shaft or other type fitting) to be friction welded to a workpiece, of either similar or dissimilar materials, or two circular shafts, can be friction welded together by use of a friction welder fitting apparatus that can first drill a hole and then weld a fitting in place, in line with that hole. The friction welder drill and fuse fitting apparatus includes the following integrally coupled components: a friction welding fitting, a drilling mechanism, an engagement mechanism, and an attachment means.

21 Claims, 7 Drawing Sheets

FRICTION WELDING DRILL AND FUSE FITTING APPARATUS

Pursuant to 35 U.S.C. § 119(e), this application derives from a provisional application for the same invention filed on Jun. 19, 1996, provisional serial No. 60/016,086.

BACKGROUND OF THE INVENTION

1. Field of the Invention

This invention relates generally to an apparatus and method for combing the operation of drilling a hole into a substrate workpiece and fusing a friction welding fitting onto that substrate in one set-up operation. The rotatable workpiece (stud, shaft or other type fitting) to be friction welded to a substrate workpiece, of either similar or dissimilar materials, or two circular shafts, can be friction welded together by use of an apparatus that can first drill a hole and then weld a fitting in place, in line with that hole. Friction welding, in general, is covered by prior art and it is envisioned that the invention disclosed herein could be adaptable to a wide range of friction welding apparatuses, since the apparatus disclosed herein could be adapted to many friction welder rotatable workpieces. This invention specifically relates to a friction welder drill and fuse fitting apparatus which can be utilized with a wide range of friction welder apparatuses, and methods for its use, although not limited to the geometric configurations provided herein.

2. Description of the Prior Art

One of the common industrial applications for fittings is the use of fittings on such industrial equipment "substrates" as tanks filled with liquid or gas, lines carrying liquid or gas, valves retrofitted for valve gland packing restoration, fire sprinkler system lines, plumbing lines, instrumentation fittings and other type fittings. These fittings could have multifaceted purposes, such as connecting other tanks and lines, instrumentation controls and readouts, valves, and other connecting apparatuses in both industrial and commercial applications. Fittings can be made from many different materials, depending on the strength and application requirements and are installed using many different techniques such as standard welding and drill and tap techniques. Other methods and techniques may include making the fitting an integral part of the substrate workpiece structure.

Integral fittings made part of another structure are, generally, completed in the original machining and fabrication process and are, generally, designed to meet the needs of equipment for which the fitting is integral with. However, most applications for fittings are installations that are separate from the manufacturing of the substrate equipment and generally completed in the field or in an industrial plant. There are many such applications where a fitting, stud or other apparatus is attached to a substrate such as a tank, plate, valve or some other type substrate workpiece.

Fittings installed by drilling and tapping methods result, first, in a threaded hole and then, second, turning a threaded fitting in, to be secured in that threaded hole. This achieves at least two objectives: (1) a fitting is installed to be used for a specific purpose; and (2) a hole exists where the threads were tapped.

Some of the disadvantages of the drill and tap method for the above options include, but are not limited to: (1) there are concerns for drilling a hole in a pressure vessel where the drill hole is exposed to the atmosphere during and after the operation; (2) there are concerns for drilling into a vessel with liquid inside, where the drilled hole is exposed to the atmosphere during and after the operation; (3) drilling a hole is a separate operation and requires separate tools and operation time: (4) tapping threads after drilling the holes requires time and tools: (5) the drilled hole to accommodate the tap may be larger than permitted or required; (6) tapped holes are not strong when compared to the substrate material; (7) tapped holes may not be easily completed in certain substrate materials, where the tap cannot be effectively utilized; (8) tapping under pressure conditions can be hazardous; (9) tapping holes with liquid in the area could be difficult and hazardous; and (10) threaded fittings are subject to leakage when installed and after a time period of use.

To give another illustration of installing fittings which require a connecting hole, there are many applications where a fitting, stud or other apparatus is attached to a substrate, such as a tank, plate, valve or some other type substrate workpiece, by standard or automatic welding procedures. The joining of materials to form a strong cohesive, high strength, fine grain weld bond is common to industry throughout the world. It is commonly achieved by arc welding, o-xyfule gas welding, flash welding, brazing, soldering, electron beam welding, laser beam welding and other techniques where open flame does not present an explosive hazard. In most cases, the exposed flame or arc creates no hazard and is practical to use. In addition to the explosive hazard, another concern is the bonding of dissimilar materials.

Fittings are installed by first welding a fitting at a preselected location and then, drilling a hole through the fitting and into the substrate. This achieves two objectives: (1) a fitting is installed to be used for a specific purpose and is securely in place; (2) a hole can then be drilled with the fitting in place; and (3) there are no threads to permit liquids or gas to leak. Some of the disadvantages of the standard weld and drill method described above include, but are not limited to: (1) welding introduces significant heat to the general area of the substrate and depending on the application, the heat may not be acceptable; (2) welding techniques require a certified and qualified weld technician to assure good bonding and safe procedures; (3) welding cannot be completed unless there is adequate room for covering all areas of the fitting; (4) in areas where combustible gases are present, it is not usually possible to use an open flame or arc welding procedure, due to the attendant danger of fire or explosion; (5) some materials, such as stainless steel, will not easily bond with aluminum alloys using the aforementioned welding processes; (6) there are concerns for drilling a hole in a pressure vessel where the drill hole is exposed to the atmosphere during and after the operation; (7) there are concerns for drilling into a vessel with liquid inside, where the drill hole is exposed to the atmosphere during and after the operation; (8) drilling a hole is a separate operation and requires separate tools and operation time; (9) the drilled hole, to accommodate the tap, may be larger than permitted or required; (10) welding fittings to pressure vessels or lines can be hazardous; (11) welding holes to vessels or lines with liquid could be hazardous and cause poor weld conditions; (12) surface preparation requires time and expense; and (13) the process is lengthy and cumbersome.

One solution to the above-outlined problems is the friction weld procedure, which achieves a fusion bond when installing fittings which require a connecting hole, in an application where a fitting, stud or other apparatus is attached to a substrate such as a tank, plate, valve or some other type substrate workpiece. The friction welding fusion bonding process and its related processes rely on friction heat generation between surfaces to provide a material flux which may be forged to produce an integral bond between the surfaces. In the friction welding process, relative rotation between a pair of workpieces (i.e., the two pieces to be welded together, a rotatable workpiece and a stationary substrate workpiece) is caused while the workpieces are urged together. All friction welders have a means of holding the rotatable workpiece (fittings of various types) in a collet type device. Some collets hold the workpiece by mechanically tightening and clamping against the workpiece, other collets hold the workpiece by threads, still others have a slip-and lock arrangement, either direct mechanical linkage or by some sort of centrifugal clamping mechanism, which tightens up against the workpiece when rotation begins, and other collets have various geometries to hold the rotatable workpiece during the friction welding process.

In conventional friction welding, the rotatable workpiece (fitting) is attached in the collet of a motor driven unit and rotated at a predetermined speed, while the other stationary workpiece is maintained in a fixed, stationary orientation. When the appropriate rotational speed is reached, the two workpieces are brought together and an axial force is applied. Heat is generated as a result of the friction generated by the interface of the respective surfaces, which continues for a predetermined time or until a preset amount of upset takes place. Thereafter, the rotational driving force is discontinued and the rotation of the rotatable workpiece is stopped. The axial force between the two members is maintained or increased, however, for a predetermined period of time to finalize the weld. The rotatable workpiece can be cylindrical, rectangular, square, curved or other geometric configuration such as a stud or shaft. The stationary workpiece can also be rectangular, square, curved or other geometric configuration such as a tank, pipe, other fitting, line or other configuration requiring a fitting with a through hole.

Further describing the friction weld process, after the friction welding process has started, on initial contact of the welding surfaces, there is a "burn-off" phase which removes foreign materials from contact area of both workpieces, The "burn-off" phase, is immediately followed, in an outward radial direction, by an "upset" phase where specific contact areas of both workpieces are turned to a plastic condition, causing the establishment of a flux of hot metal due to the relative rotation and high axial pressure urging the two workpieces together, caused by resistive friction between the workpieces. After automatic or operator shutdown of the rotation of the rotatable workpiece, there is a "forging" phase where axial pressure is maintained between the workpieces until the plastisized material cools and the weld fuses during "fusion bonding" phase.

The advantages of the friction welding process include, but are not limited to: (1) flux and shielding gas are not required; (2) in most cases, the weld strength is as strong as or stronger than the weaker of the two materials being joined; (3) surface cleanliness is not as significant, compared with other welding processes, since friction welding tends to disrupt and displace surface films; (4) there are narrow heat-affected zones; (5) the process is generally environmentally clean; (6) friction welding is suitable for welding most engineering materials and is well suited for joining many dissimilar metal combinations; (7) no filler material is needed; (8) operators are not required to have manual welding skills; (9) the process is easily automated for mass production; and (10) welds are made rapidly compared to other welding processes.

Friction welding has been used in the past to install fittings in such applications where a fitting, stud or other apparatus is attached to a substrate such as a tank, plate, pipes, lines, valve or other type substrate workpiece, in an industrial or commercial application, and a through hole would be part of the requirements. The fitting is first fused to the substrate workpiece and, then, the hole is drilled, axially through the fitting, as a second operation after the friction welded fitting is fused to the substrate workpiece. Some of the disadvantages include, but are not limited to: (1) there are concerns for drilling a hole in a pressure vessel where the drill hole is exposed to the atmosphere during and after the operation; (2) there are concerns for drilling into a vessel with liquid inside, where the drilled hole is exposed to the atmosphere during and after the operation; and (3) drilling a hole is a separate operation and requires separate tools and operation time.

One solution to the above-outlined problems is the "friction welder drill and fuse fitting apparatus", the subject of this invention. While this invention does not describe a new concept in a friction welding machine apparatus or a new concept in holding the friction welding rotatable fitting (bolt, stud, shaft, or etc.) with a collett, it does, however, present a unique and novel concept and method whereas a drill bit geometry can be made an integral part or attachment to a rotatable friction welding fitting, so as to permit the drilling of a hole in a substrate workpiece and fusing a friction welding fitting, in line over that hole, in one set-up operation. The friction welder drill and fuse fitting apparatus can also be made an integral part or attachment to the substrate workpiece.

The advantages of the friction welder drill and fuse fitting apparatus include, but are not limited to: (1) maximum fusion bonding and weld strength can be achieved to and, in some cases, beyond the diameter of a standard fitting; (2) greater strength is achieved with the friction welder drill and fuse fitting apparatus; (3) the fusion of the fitting to the substrate and the drilling of the hole is accomplished in one operation; (4) provisions can be made to provide sealing, while drilling and fusing a fitting to a substrate that is pressurized; (5) provisions can be made to provide sealing while drilling and fusing a fitting to a substrate that contains liquid; (6) the drill and fuse technique and method is simple and consumes less time than above described methods; (7) a fusion seal, or other type sealing means, can effectively block gas or liquid when friction welding a drill and fuse fitting apparatus to a tank, line or other object containing gas or liquid, prior to the drill bit breaking through the substrate workpiece; and (8) valves, seals, caps, plugs, one way valves or other components, to maintain pressure and leak tight conditions, during and after the fitting is installed, can be adapted to, or integral to a drill and fuse fitting, thus permitting access to and through the fitting at a later time.

Thus, while friction welding of fittings to substrates has met with general acceptance in industry in the friction welding installation of fasteners and other components, there has been a need in the art for installing a fitting and drilling a hole for access through that fitting with a through hole in a single set-up operation.

There has been an additional need in the art for friction welding installation of a fitting and drilling a hole for access through that fitting in a single set-up operation, without the concern for liquids or pressurized gases contained in a substrate vessel.

There has also been a need in the art for friction welding installation of a fitting and drilling a hole for access through that fitting in a single set-up operation, whereas another fitting, pipe, line or other component can be attached after the fitting has been installed. There has been an additional need in the art for friction welding installation of a fitting and drilling a hole for access through that fitting in a single set-up operation, where that drilled hole can be effectively blocked by a cap, plug, valve or other device until later used to connect piping, instrumentation, fittings and other connectors, without the concern for pressure or liquid contained in a substrate vessel.

SUMMARY OF THE INVENTION

The present invention solves significant problems in the art by providing a friction welder drill and fuse fitting apparatus and a method for its use. Generally described, the present invention provides for an apparatus that can be integral or be made of two components, whereas a drill bit is installed in a rotatable workpiece fitting, to be removed after installation of the fitting, or the drill bit becomes an integral part of a friction welding rotatable workpiece, or in some cases, stationary substrate workpiece, to permit the drilling and friction weld fusion in one set-up operation, enhancing both the versatility and cost effectiveness of the finished fitting product.

In a preferred embodiment for achieving friction welding drill and fusing of a fitting, a non-integrated friction welder drill and fuse fitting apparatus provides a means and method to achieve the operation in one set-up operation, and custom designed drill bit adapters are easily installed and later removed on the rotatable workpiece fitting, and in specific applications, on both the rotatable workpiece fitting and the stationary workpiece, such as when welding two rods together.

The apparatus includes one or more design type drill bit adapters and friction welding fusion fittings to fit a specific application. The drill bit adapters can be threaded into the rotatable workpiece fitting, held in place by a set screw or other holding means. The adapters will be custom shaped for a range of applications and friction welder apparatuses to achieve drilling and friction weld fusion in one set-up operation. Other attachments to the friction weld fitting could be plugs, valves, caps and other means and methods for maintaining a closed system that can be opened at later time.

In another preferred embodiment of the invention, an integrated friction welding drill and fuse fitting apparatus provides a means and method to achieve the operation in one set-up operation. The drill bit configuration and the friction welding fitting can be integrated and machined as one component or integrated by the permanent connection of several components, where each component can be made of different materials as the application demands.

The apparatus includes one or more design type friction welder drill and fuse fitting apparatuses to fit various applications. The fitting can have both external and internal threads to permit the installation of other fittings, pipes, lines, plugs, caps, valve or other components.

The friction welder drill and fuse fitting apparatus can also have integral, or permanently built into its body, check valves, ball valves and other means of opening and closing pressurized gases or liquids, as required. The friction welder drill and fuse fitting apparatus can be custom shaped for a range of applications and friction welder apparatuses to achieve drilling and friction weld fusion in one set-up operation. One or more design concepts could be effective.

DETAILED DESCRIPTION OF THE PREFERRED EMBODIMENTS

Figure 1:
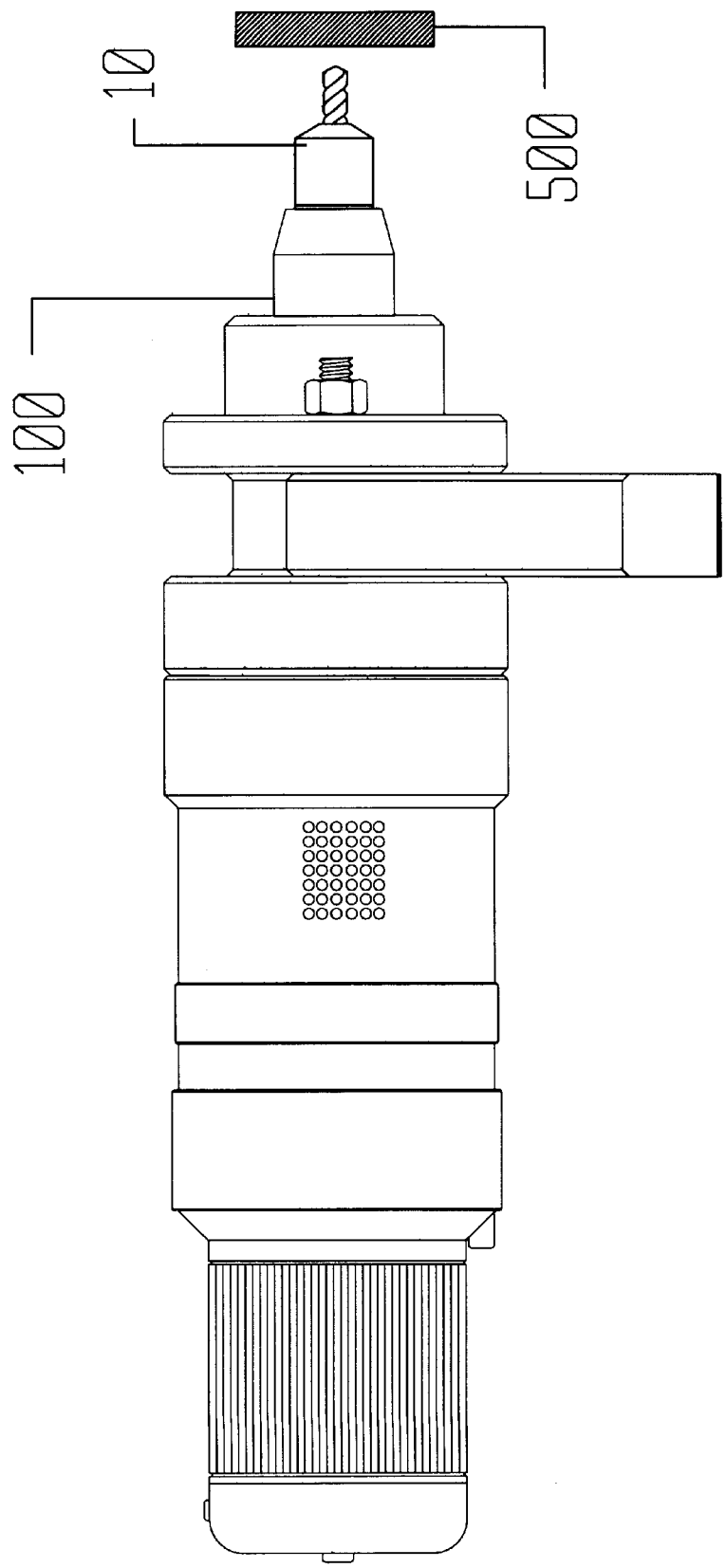
FIG. 1 is a side view of an exemplary friction welding device as it may be used with the fuse fitting of the present invention.
Figure 2:
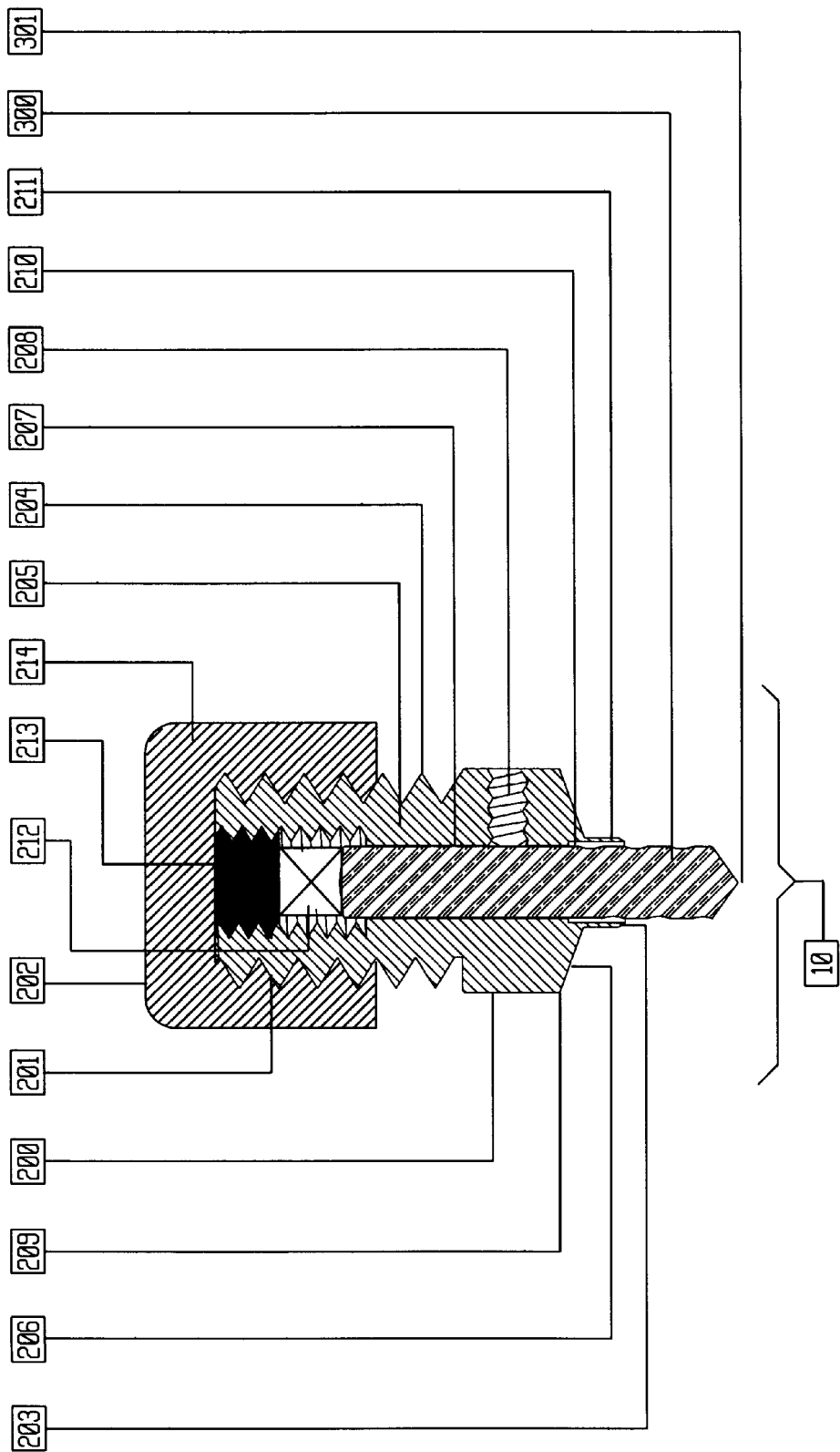
FIG. 2 is an overall cross-sectional side view of a preferred embodiment of the non-integrated type friction welder drill and fuse fitting apparatus showing the friction weld fitting, drill bit adapter and the location of several through hole closure adapter elements of the present invention.
Figure 3:
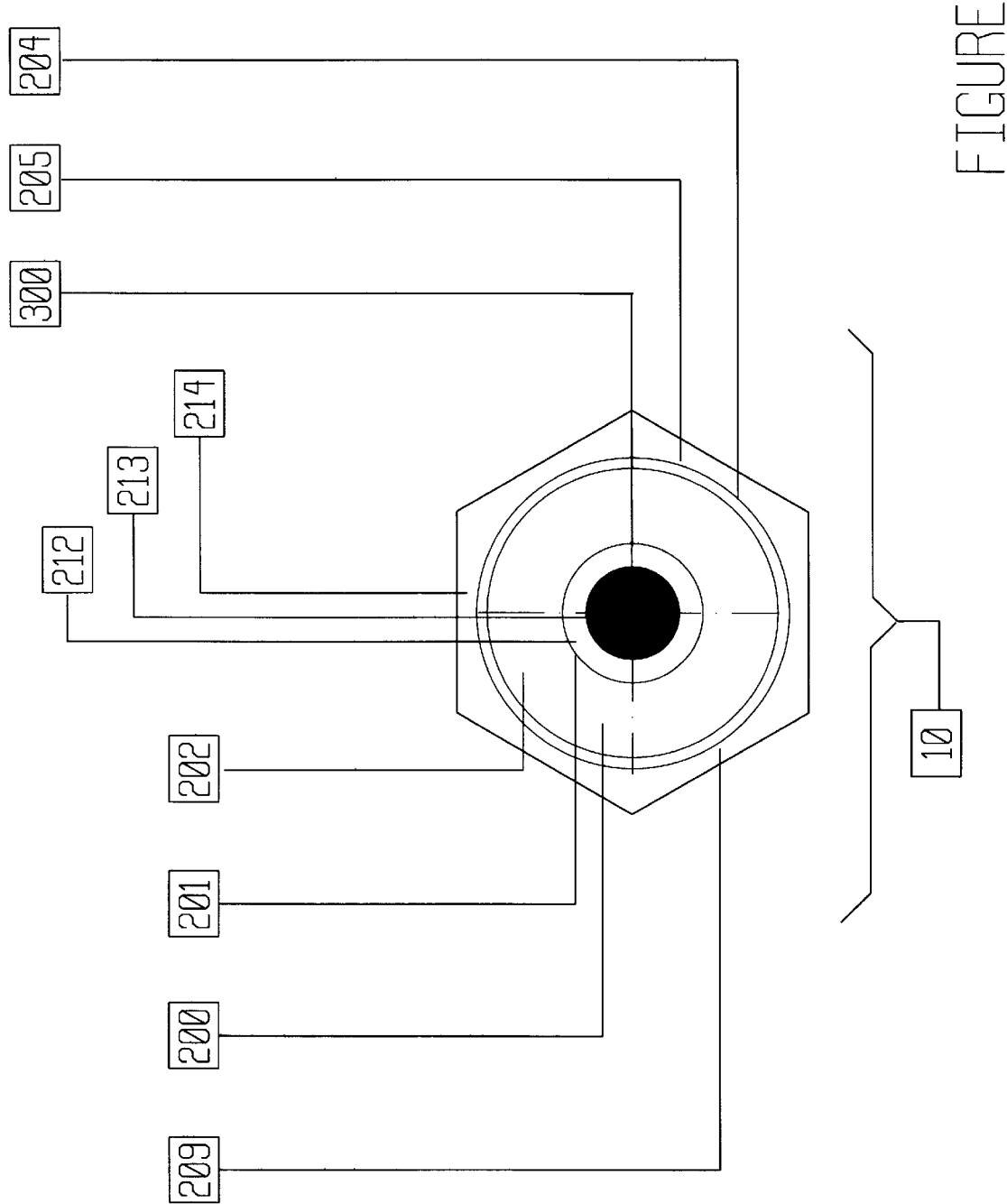
FIG. 3 is an proximal end view of the apparatus illustrated in FIG. 2
Figure 4:
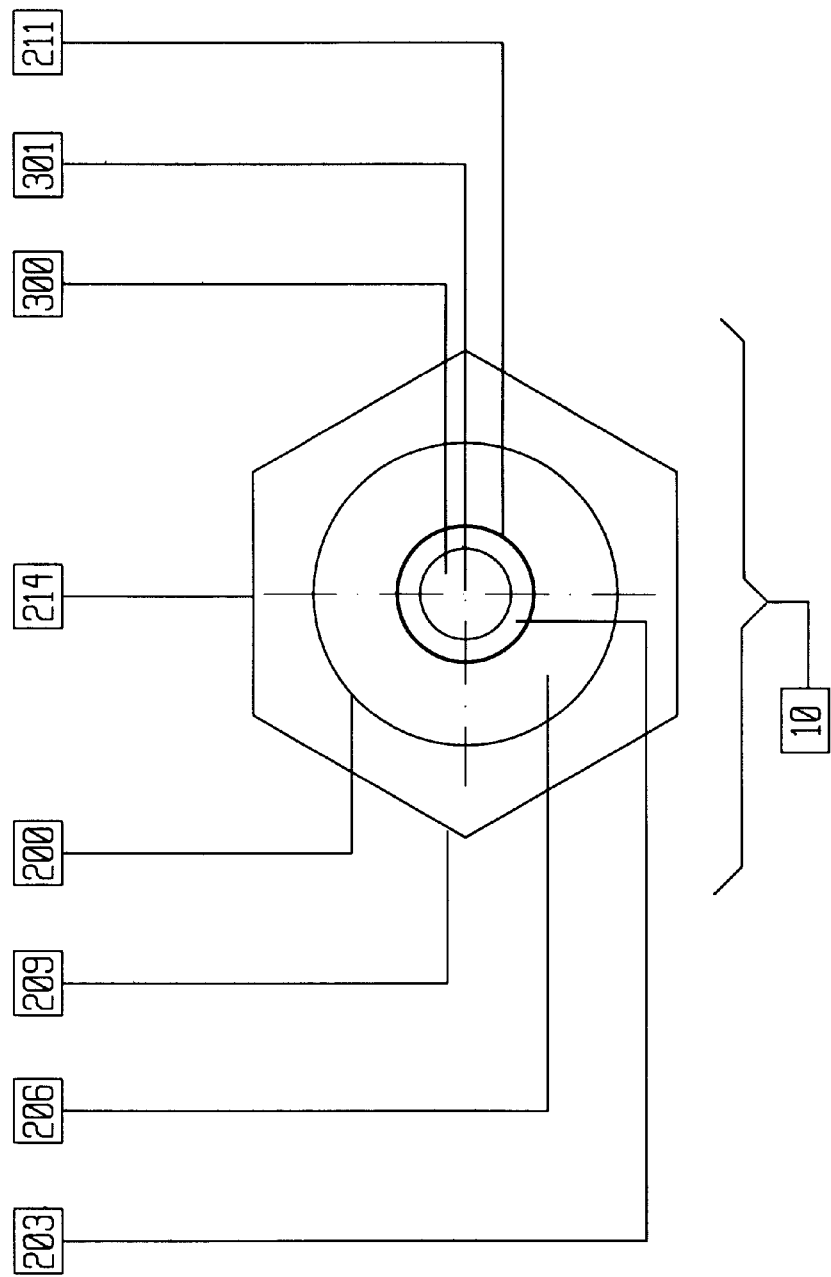
FIG. 4 is a distal end view of the apparatus illustrated in FIG. 2.

Referring initially to FIGS. 1–7 of the drawings, in which like numerals indicate like elements throughout the views of several preferred embodiments, the friction welder drill and fuse fitting apparatus of this invention is generally illustrated by reference numeral 10 in any preferred embodiment.

Referring initially to FIG. 1 and FIGS. 2–4 of the drawings, where a preferred embodiment of the non-integrated friction welder drill and fuse fitting apparatus is shown, where like numerals indicate like elements throughout the views, the friction welder drill and fuse fitting apparatus 10 is generally held in place by a standard or custom designed friction welder apparatus workpiece fitting collet 100. Also included is a friction welder rotatable workpiece, a friction welder non-integrated rotatable fitting 200, where a slip-in type friction welder non-integrated rotatable fitting drill bit adapter 300 installed on friction welder non-integrated rotatable fitting 200, which comprises the basic friction welder drill and fuse fitting apparatus 10. Also included is a substrate workpiece 500, which could be stationary or rotatable.

Substrate workpiece could be a pressurized tank, line, valve, fitting, pipe, or other device, or a tank, line, valve, fitting, pipe or other device filled with liquid, or any other substrate workpiece where the operator desired to place a friction welder drill and fuse fitting apparatus 10. Friction welder non-integrated rotatable fitting 200 and substrate workpiece 500 can be made from a number of materials, each similar to or dissimilar from the other, depending on the application. Such materials include, but are not limited to stainless steel, carbon steel, aluminum alloys, brass, titanium, zirconium alloys and other alloys. The friction welder non-integrated rotatable fitting 200 is generally round in geometry, but can be of other cross-sectional geometries such as square, rectangular, hex or other geometric configurations. Substrate workpiece 500 can be of various geometries, such as flat, round, or other geometric configurations. Substrate workpiece 500 is generally stationary and clamped in place, but can be circular and moved in an axial direction in certain friction welding conditions and configurations.

Friction welder non-integrated rotatable fitting drill bit adapter 300 would be made of materials common to drill bits, the material depending on the application. An integrated friction welder drill and fuse fitting apparatus 10 will be described later, whereas friction welder non-integrated rotatable fitting 200 and friction welder non-integrated rotatable fitting drill bit adapter 300 can be fabricated as an integral part of a friction welding fitting. In this preferred embodiment, the components are integrally coupled in a manner described below. Referring again to FIG. 1 and FIGS. 2–4, prior to the installation of friction welder non-integrated rotatable fitting 200 into friction welder apparatus workpiece fitting collet 100, friction welder non-integrated fitting drill bit adapter 300 is secured in place in a manner as shown in FIGS. 2–4.

Friction welder non-integrated fitting drill bit adapter 300 can be threaded into a friction welder non-integrated rotatable fitting internal threads 201, or otherwise mechanically attached to the friction welder non-integrated rotatable fitting 200 in the area of a friction welder non-integrated fitting proximal end 202. Friction welder non-integrated rotatable fitting drill bit adapter 300 is pushed through a friction welder non-integrated rotatable fitting drill bit bore 207 so that a friction welder non-integrated rotatable fitting drill bit adapter distal end 301 is preset out past a friction welder non-integrated rotatable fitting distal end 203 to a desired position. Friction welder non-integrated rotatable fitting drill bit adapter 300 is then mechanically attached, either by threading of friction welder non-integrated rotatable fitting drill bit adapter 300 to the friction welder non-integrated rotatable fitting 200 in the area of friction welder non-integrated rotatable fitting internal threads 201, or by other type fastening method. One such type of fastener would be a friction welder non-integrated rotatable fitting drill bit adapter set screw 208. Other anchoring techniques could include lock type nuts, pins and other such devices (not shown) all of which secure friction welder non-integrated rotatable fitting drill bit adapter 300 onto friction welder non-integrated rotatable fitting 200. Friction welder non-integrated rotatable fitting 200 is depicted as a fitting with friction welder non-integrated rotatable fitting internal threads 201 and a friction welder non-integrated rotatable fitting external threads 204 . Friction welder non-integrated rotatable fitting proximal end 202 is inserted into friction welder apparatus workpiece fitting collet 100. Friction welder non-integrated rotatable fitting distal end 203 is generally shaped with an angle to flat section defining a friction welder non-integrated rotatable fitting reaction surface 206 which extends out to a friction welder non-integrated rotatable fitting peripheral edge 209 to accommodate the friction welding process. Friction welder non-integrated rotatable fitting proximal end 202 will be designed to meet the geometric shape and locking requirements of a specific friction welder apparatus workpiece fitting collet 100.

Friction welder non-integrated rotatable fitting 200 consists of a friction welder non-integrated rotatable fitting body 205 with friction welder non-integrated rotatable fitting external threads 204. Friction welder non-integrated rotatable fitting external threads 204 also provide for a threaded attachment (location only shown), such as a friction welder non-integrated rotatable fitting valve adapter 212, a friction welder non-integrated rotatable fitting plug adapter 213, a friction welder non-integrated rotatable fitting cap adapter 214, and/or other attachment required by an application. Additionally, the area where friction welder non-integrated rotatable fitting external threads 204 are shown could be of another machined configuration, if an application requires some other configuration other than internal threads. The area of friction welder non-integrated rotatable fitting proximal end 202 may also be absent of threads if the application requires some other geometric configuration.

A friction welder non-integrated rotatable fitting recess area 210 isolates and interfaces with friction welder non-integrated rotatable fitting drill bit adapter 300 from a friction welder non-integrated rotatable fitting fusion seal 211 and friction welder non-integrated rotatable fitting reaction surface 206 during the fusion process, so that friction welder non-integrated rotatable fitting drill bit adapter 300 can be easily removed at the completion of the friction welding process, after the hole has been drilled through substrate workpiece 500.

The friction welder non-integrated rotatable fitting 200, for a specific application, is designed to fit a specific collet and is inserted into the friction welder apparatus workpiece collet 100 in a secure fashion to permit friction welding of friction welder non-integrated rotatable fitting 200 to a substrate of similar or dissimilar materials.

Referring to FIG. 1 and FIGS. 2–4, specific friction welder apparatus workpiece fitting collet 100 could include collets from any type friction welder, portable or stationary type, where such collets could hold a friction welder non-integrated rotatable fitting 200 by mechanically tightening and clamping against the friction welder non-integrated rotatable fitting 200, or hold the non-integrated rotatable fitting 200 by threads, or hold the friction welder non-integrated rotatable fitting 200 by means of a slip-and lock arrangement, either direct mechanical linkage or by some sort of centrifugal type clamping mechanism, which tightens up against friction welder non-integrated rotatable fitting 200 when rotation begins. There are many other various geometries which are designed to hold the rotatable workpiece during the friction welding process.

The collet is part of a friction welder apparatus (not shown) and is rotated or otherwise moved to create friction between the workpieces and, at the same time, the collet is urged toward the stationary workpiece to complete the friction welding process, first drilling with friction welder non-integrated rotatable fitting drill bit adapter 300, then sealing, if applicable, with friction welder non-integrated rotatable fitting fusion seal 211, and then completing the drilling and fusion, where friction welder non-integrated rotatable fitting reaction surface 206 is rotated and urged against substrate workpiece 500 to generate heat and turn the fusion area material to a plastic state, in a radial direction toward friction welder non-integrated rotatable fitting peripheral edge 209. The actual dimensions of friction welder drill and fuse fitting apparatus 10 will vary, depending on the application and materials used.

Figure 5:
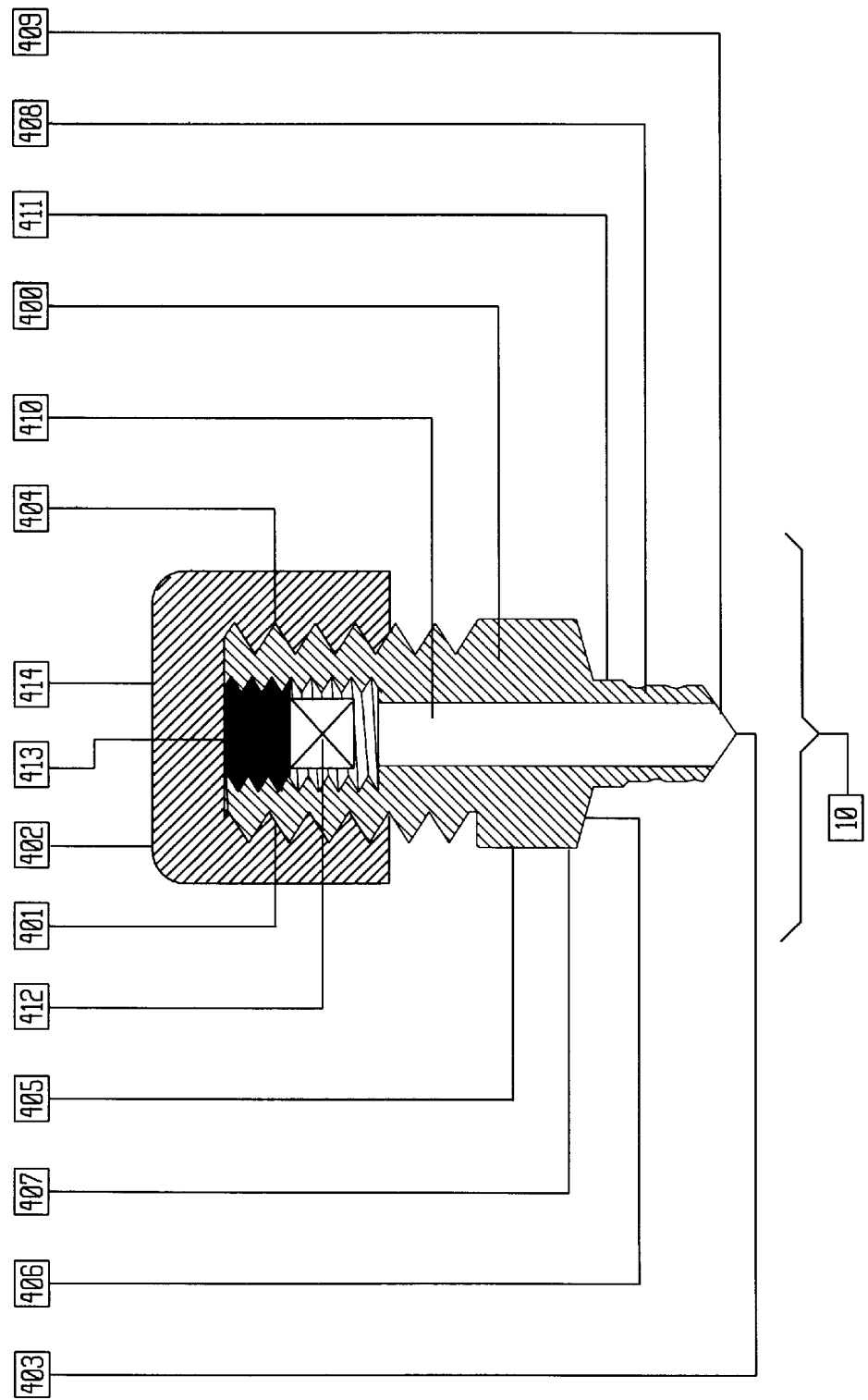
FIG. 5 is an overall cross-sectional side view of a preferred embodiment of the integrated type friction welder drill and fuse fitting apparatus showing the basic apparatus and the location of adapter type or integral type through hole closure elements of the present invention.
Figure 6:
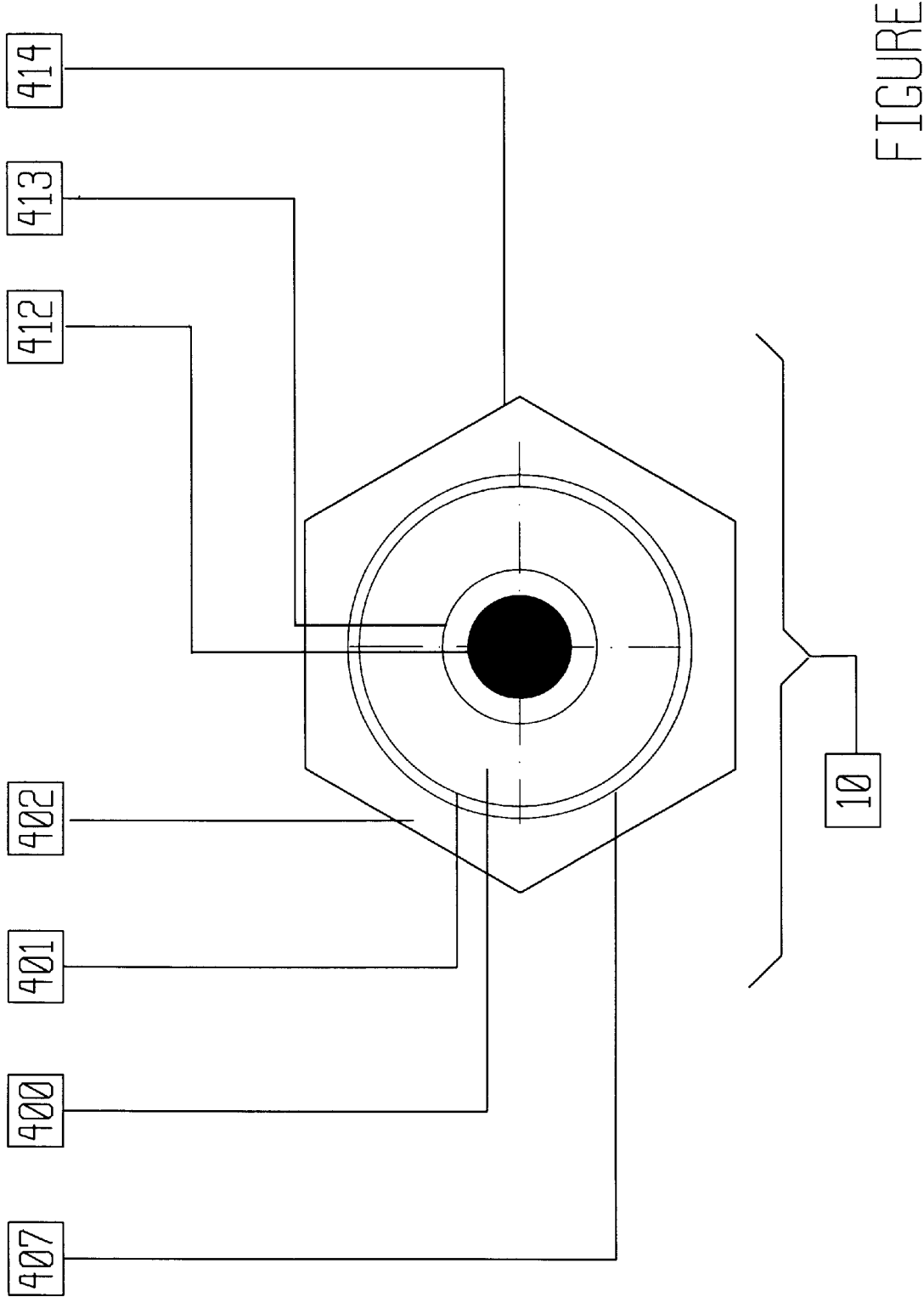
FIG. 6 is a proximal end view of the apparatus illustrated in FIG. 5.
Figure 7:
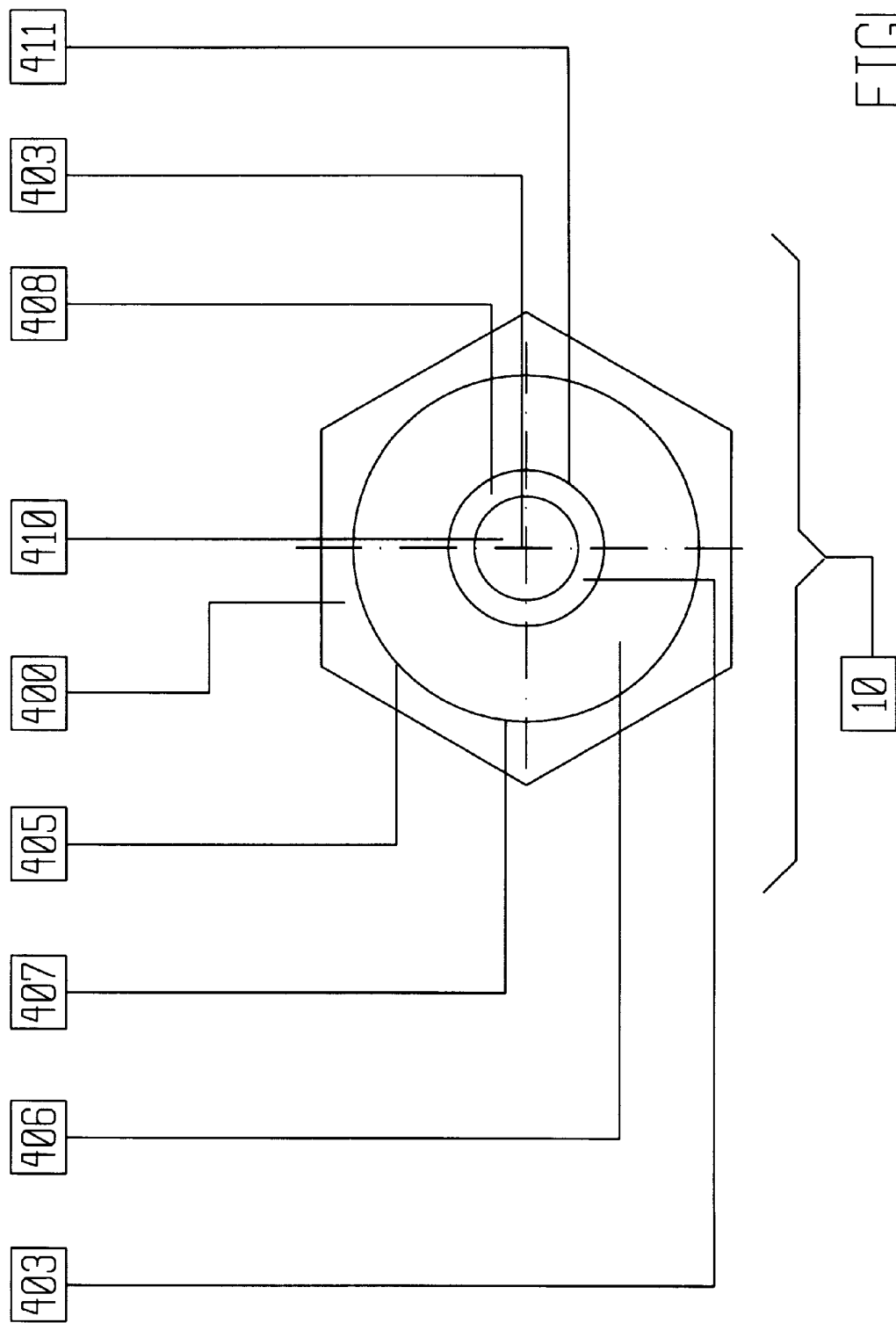
FIG. 7 is a distal end view of the apparatus illustrated in FIG. 5.

Referring to FIG. 1 and FIGS. 5–7 of the drawings, in another preferred embodiment of the drawings, in which like numerals indicate like elements throughout the views, the friction welder drill and fuse fitting apparatus 10 is set forth in FIG. 5 and generally includes a specific friction welder apparatus workpiece fitting collet 100, a friction welder integral drill and fuse rotatable fitting 400 which is, in this embodiment, the drill section machined integral with the friction welding rotatable workpiece, which is, in itself, a rotatable workpiece where all its components combine to make the friction welder drill and fuse fitting apparatus 10. Friction welder drill and fuse fitting apparatus 10 integrated components, remain intact, prior to, during and after the friction weld operation has been completed, unless a specific adapter is used.

Also included is substrate workpiece 500, which could be stationary or rotatable. Substrate workpiece could be a pressurized tank, line, valve, fitting, pipe, or other device, or a tank, line, valve, fitting, pipe, or other device filled with liquid, or any other substrate workpiece where the operator desired to place a friction welder drill and fuse fitting apparatus 10. Substrate workpiece 500 can be of various geometries such as flat, round, or other geometric configurations. Substrate workpiece 500 is generally stationary and clamped in place, but can be circular and moved in an axial direction in certain friction welding conditions and configurations. Substrate workpiece 500 can be made from a number of materials, each similar to or dissimilar from the other, depending on the application. Such materials include, but are not limited to stainless steel, carbon steel, aluminum alloys, brass, titanium, zirconium alloys and other alloys.

In this preferred embodiment, the components are integrally coupled in a manner described herein. The friction welder integral drill and fuse rotatable fitting 400 is a friction weld fitting made integral with a friction welder integral drill and fuse rotatable fitting drill bit section 408 to comprise, with all the other components to be described herein, to be similar to the type friction welder drill and fuse fitting apparatus 10 previously generally described in the first preferred embodiment herein, but with changes required for an integral structure.

Friction welder integral drill and fuse rotatable fitting 400 and its components comprising friction welder drill and fuse fitting apparatus 10 are generally round in geometry, but can be of other cross-sectional geometries such as square, rectangular, hex or other geometric configurations. Friction welder integral drill and fuse rotatable fitting 400 consists of a friction welder integral drill and fuse rotatable fitting body 405 with a friction welder integral drill and fuse rotatable fitting external threads 404 if serving as threaded fitting, or it can have an external finish that is rough or machined surface if serving as a shaft or other fastener of another configuration.

Referring again to FIG. 1 and FIGS. 5–7, friction welder integral drill and fuse rotatable fitting 400 is depicted as a fitting with friction welder integral drill and fuse rotatable fitting external threads 404. A friction welder integral drill and fuse rotatable fitting proximal end 402 is designed for insertion into a specific friction welder apparatus workpiece fitting collet 100. A friction welder integral drill and fuse rotatable fitting distal end 403 is generally shaped with an angle to flat section defining a friction welder integral drill and fuse rotatable fitting reaction surface 406 which extends out to a friction welder integral drill and fuse rotatable fitting peripheral edge 407 to accommodate the friction welding process, but could be other type shaped geometry.

A friction welder integral drill and fuse rotatable fitting drill bit end 409 extends out past friction welder integral drill and fuse rotatable fitting distal end 403 to a specific design distance for a particular application. A friction welder integral drill and fuse rotatable fitting fusion seal section 411 provides a leak tight condition during the drilling process, against pressurized gas or liquids contained in a vessel, valve or other such type substrate workpiece before friction welder integral drill and fuse rotatable fitting drill bit end 409 penetrates the backside of substrate workpiece 500. Friction welder integral drill and fuse rotatable fitting fusion seal section 411 is generally made from a metallic material, which when fused onto substrate workpiece 500, blocks any flow that would normally attempt to escape through the hole drilled by friction welder integral drill and fuse rotatable fitting drill bit section 408 before the friction welding process has been completed.

Prior to installing friction welder drill and fuse fitting, apparatus 10 in friction welder apparatus workpiece fitting collet 100, a friction welder integral drill and fuse rotatable fitting valve 412, a friction welder integral drill and fuse rotatable fitting plug 413, a friction welder integral drill and fuse rotatable fitting cap 414 and/or some other sealing device may be installed in a friction welder integral drill and fuse rotatable fitting internal threads 401 at the area of friction welder integral drill and fuse rotatable proximal end 402 to prevent any liquid or gas that may be contained in substrate workpiece 500 from escaping from the passageway that exist from a friction welder integral drill and fuse rotatable fitting through hole 410 on through the area of friction welder integral drill and fuse rotatable fitting internal threads 401 at the area of friction welder integral drill and fuse rotatable proximal end 402. Friction welder integral drill and fuse rotatable fitting valve 412, friction welder integral drill and fuse rotatable fitting plug 413, friction welder integral drill and fuse rotatable fitting cap 414 and/or some other sealing device may be made integral to and/or adapted to friction welder integral drill and fuse rotatable fitting 400.

Friction welder integral drill and fuse rotatable fitting 400 can be of various geometries such as flat, round, or other geometric configurations. Friction welder integral drill and fuse rotatable fitting 400 can also be made from a number of materials, each similar to or dissimilar from the other, depending on the application. Such materials include, but are not limited to stainless steel, carbon steel, aluminum alloys, brass, titanium, zirconium alloys and other alloys. Materials selected may vary, from component to component, comprising friction welder drill and fuse fitting apparatus 10. For example, in considering composite materials, friction welder integral drill and fuse rotatable fitting 400 is a friction weld fitting made integral with friction welder integral drill and fuse rotatable fitting drill bit section 408 by friction welder integral drill and fuse rotatable fitting body 405, but each of these components can be made of different materials as the application requires for strength and durability.

The friction welder integral drill and fuse rotatable fitting 400, for a specific application, is designed to fit a specific collet and is inserted into the friction welder apparatus workpiece fitting collet 100 in a secure fashion, such as threading by means of friction welder integral drill and fuse rotatable fitting external threads 404, or by some other mechanical locking device as aforementioned, to permit friction welding of friction welder integral drill and fuse rotatable fitting 400 to substrate workpiece 500.

Referring again to FIG. 1 and FIGS. 5–7, friction welder apparatus workpiece fitting collet 100 could include collets from any type friction welder, portable or stationary type, where such collets could hold friction welder integral drill and fuse rotatable fitting 400 by mechanically tightening and clamping against the friction welder integral drill and fuse rotatable fitting 400, or hold the friction welder integral drill and fuse rotatable fitting 400 by threads, or hold the friction welder integral drill and fuse rotatable fitting 400 by means of a slip-and lock arrangement, either direct mechanical linkage or by some sort of centrifugal type clamping mechanism, which tightens up against friction welder integral drill and fuse rotatable fitting 400 when rotation begins. There are many other various geometries which are designed to hold the rotatable workpiece during the friction welding process.

Collet 100 is part of a friction welder apparatus and is rotated or otherwise moved to create friction between the workpieces and, at the same time, collet 100 is urged toward the stationary workpiece to complete the friction welding process, first drilling with friction welder integral drill and fuse rotatable fitting drill bit section 408, then sealing, if applicable, with friction welder integral drill and fuse rotatable fitting fusion seal section 411, and then completing the drilling and fusion, where friction welder integral drill and fuse rotatable fitting reaction surface 406 is rotated and urged against substrate workpiece 500 to generate heat and turn the fusion area material to a plastic state, extending out in a radial direction toward friction welder integral drill and fuse rotatable fitting peripheral edge 407.

OPERATION

Operation of friction welder drill and fuse fitting apparatus 10 is governed by the particular friction welder apparatus and, specifically, the control of speed and axial force provided at the point where the rotatable friction welding fitting is installed in a friction welder apparatus workpiece fitting collet 100. Prior to commencing the use of the friction welder drill and fuse fitting apparatus 10, the operator must determine if it is more desirable to utilize a friction welder non-integrated rotatable fitting 200 or custom designed friction welder integral drill and fuse rotatable fitting 400. The operator's choice will depend on the particular application.

Considering using the first preferred embodiment, the operator will make a decision to install a threaded friction welder non-integrated rotatable fitting 200 with friction welder non-integrated rotatable fitting external threads 204 that are compatible with a specific a friction welder apparatus workpiece fitting collet 100 or some other type mechanically attached friction welder non-integrated rotatable fitting 200. Prior to installing friction welder non-integrated rotatable fitting 200, the operator also selected a specific friction welder non-integrated rotatable fitting 200 with a friction welder non-integrated rotatable fitting drill bit adapter 300 that met the size, material and shape specification for a particular application.

The friction welder non-integrated rotatable fitting drill bit adapter 300 could be or have been installed on non-integrated rotatable fitting 200 by threading friction welder non-integrated rotatable fitting drill bit adapter 300 into friction welder non-integrated rotatable fitting internal threads 201, extending the drill bit section on through friction welder non-integrated rotatable fitting drill bit bore 207, or otherwise mechanically attached to the friction welder non-integrated rotatable fitting 200 in the area of friction welder non-integrated rotatable fitting internal threads 201. One such type of fastener would be friction welder non-integrated rotatable fitting drill bit adapter set screw 208. Other anchoring techniques could include lock type nuts, pins and other such devices (not shown) all of which secure friction welder non-integrated rotatable fitting drill bit adapter 300 onto friction welder non-integrated rotatable fitting 200. Some of the other parameters that the operator considered would be the material and relative size requirements of friction welder non-integrated rotatable fitting body 205, friction welder non-integrated rotatable fitting reaction surface 206, and friction welder non-integrated rotatable fitting drill bit adapter 300. The operator also needs to determine whether or not there is a requirement for an adapter type, friction welder non-integrated rotatable fitting valve adapter 212, friction welder non-integrated rotatable fitting plug adapter 213, friction welder non-integrated rotatable fitting cap adapter 214, and/or other attachment required by an application and make his choice accordingly. The operator also needs to determine whether or not there is a requirement for friction welder non-integrated rotatable fitting fusion seal 211 to seal against pressurized gas or liquid contained in substrate workpiece 500.

The operator then installs friction welder non-integrated rotatable fitting 200 friction welder non-integrated fitting proximal end 202 into friction welder apparatus workpiece fitting collet 100. The design of friction welder apparatus workpiece fitting collet 100 could include collets of various designs from any type friction welder, portable or stationary type, where such collets could hold a friction welder non-integrated rotatable fitting 200 by mechanically tightening and clamping against the friction welder non-integrated rotatable fitting 200, or hold the friction welder non-integrated rotatable fitting 200 by threads, or hold the friction welder non-integrated rotatable fitting 200 by means of a slip-and lock arrangement, either direct mechanical linkage or by some sort of centrifugal type clamping mechanism, which tightens up against friction welder non-integrated rotatable fitting 200 when rotation begins. There are many other various geometries which are designed to hold the rotatable workpiece during the friction welding process. Collet 100 is part of a friction welder apparatus and is rotated or otherwise moved to create friction, and at the same time, collet 100 is urged toward the stationary workpiece to complete the friction welding process.

In operation, friction welder non-integrated rotatable fitting 200, installed in friction welder apparatus workpiece fitting collet 100, and friction welder non-integrated rotatable fitting drill bit adapter 300 is securely attached to friction welder non-integrated rotatable fitting 200 friction welder non-integrated rotatable fitting body 205 in either a threaded manner with friction welder non-integrated fitting threads 201, or other means described above, and will be rotated and urged toward substrate workpiece 500, first to commence drilling the drill hole, then fusion seal against pressure or liquid, if applicable, then continue to drill the hole in substrate workpiece 500 and then to complete the friction welding process.

After the hole has been partially drilled with friction welder non-integrated rotatable fitting drill bit adapter 300 and the friction welding process has started, on initial contact of the welding surfaces, there is a "burn-off" phase which removes foreign materials from contact area of both workpieces, (where the workpiece contact areas are defined as friction welder friction welder non-integrated rotatable fitting 200 friction welder non-integrated fitting distal end 203, friction welder non-integrated rotatable fitting fusion seal 211, if applicable, contact area of friction welder non-integrated rotatable fitting reaction surface 206 and contact area of substrate workpiece 500). The "burn-off" phase, is immediately followed by an "upset" phase, as each aforementioned contact area reaches substrate workpiece 500, while the drilling continues with friction welder non-integrated rotatable fitting drill bit adapter 300, and pressure sealing takes place with friction welder non-integrated rotatable fitting fusion seal 211 prior to friction welder non-integrated rotatable fitting drill bit adapter distal end 301 breaking through the backside of substrate workpiece 500, if applicable. Friction welder non-integrated rotatable fitting 200 is continually urged toward substrate workpiece 500. Friction welding fusion continues in an outward radial direction, during the "upset" phase, where specific defined contact areas of both workpieces are turned to a plastic condition, and there is the establishment of a flux of hot metal due to the relative rotation and high axial pressure urging the two workpieces together, caused by resistive friction between the workpieces. After automatic or operator shutdown of the rotation of the rotatable workpiece, there is a "forging" phase where axial pressure is maintained between the workpieces, until the plastisized material cools and the weld fuses during "fusion bonding" phase.

The friction welder will be programmed to stop or be stopped by operator intervention, so that fusion extends out to friction welder non-integrated fitting peripheral edge 209 and the related contact areas of substrate workpiece 500, thereby achieving greater strengths and more even temperature strata during the friction welding process, so as to distribute greater temperature in desired fusion bonding area and to eliminate weak areas at friction welder non-integrated rotatable fitting peripheral edge 209. The friction welder non-integrated rotatable fitting drill bit adapter 300 can then be removed leaving a through hole from the backside of substrate workpiece 500 on through friction welder non-integrated fitting proximal end 202, because friction welder non-integrated rotatable fitting recess area 210 provides for a separation gap. Friction welder drill and fuse fitting apparatus 10 is now fused on substrate workpiece 500 and ready for use under this non-integrated embodiment.

Considering using the second preferred embodiment, the operator made the decision to install friction welder integral drill and fuse rotatable fitting 400 with its integration of welder integral drill and fuse rotatable fitting body 405 with friction welder integral drill and fuse rotatable fitting drill bit section 408 and extended friction welder integral drill and fuse rotatable fitting drill bit end 409. There are no adjustments to be made by the operator prior to installing friction welder integral drill and fuse rotatable fitting 400 because all components are fabricated integral with one another. The operator has only to chose a specific designed friction welder drill and fuse fitting apparatus 10 that met the size, material and shape specification for a particular application. The operator also needs to determine whether or not there is a requirement for an adapter type or integral type, friction welder integral drill and fuse rotatable fitting valve 412, friction welder integral drill and fuse rotatable fitting plug 413, friction welder integral drill and fuse rotatable fitting cap 414, and/or other attachment required by an application and make his choice accordingly. The operator also needs to determine whether or not there is a requirement for friction welder integral drill and fuse rotatable fitting fusion seal section 411 to seal against pressurized gas or liquid contained in substrate workpiece 500.

Prior to commencing with the friction weld operation of the integrated friction welder drill and fuse fitting apparatus 10, the operator will choose a friction welder integral drill and fuse rotatable fitting 400 that is compatible with both the friction welder apparatus and its friction welder apparatus workpiece fitting collet 100 and the requirement of the application. For example, the application may require a friction welder integral drill and fuse rotatable fitting 400 that has a friction welder integral drill and fuse rotatable fitting valve from escaping, until such time as any one of the aforementioned devices may be used to open the passageway that exists from a friction welder integral drill and fuse rotatable fitting through hole 410, on through the area of friction welder integral drill and fuse rotatable fitting internal threads 401 at the area of friction welder integral drill and fuse rotatable proximal end 402.

Another choice the operator may make, to prepare for a particular application, would be the size, shape, material choice and design of friction welder integral drill and fuse rotatable fitting 400 and friction welder integral drill and fuse rotatable fitting drill bit section 408. The material used in friction welder integral drill and fuse rotatable fitting drill bit section 408 may be significantly different than the remaining components of friction welder integral drill and fuse rotatable fitting 400 to assure that the drilling phase of the operation goes quickly and smoothly. The operator will also look at the application to determine if the substrate workpiece is a pressurized vessel that contains liquid or gas and determine the need for any of the aforementioned valves, plugs, or caps in friction welder integral drill and fuse rotatable fitting 400 with integral friction welder integral drill and fuse rotatable fitting internal threads 401 areas.

After making application choices, the operator then installs friction welder integral drill and fuse rotatable fitting 400 at friction welder integral drill and fuse rotatable fitting proximal end 402 into friction welder apparatus workpiece fitting collet 100. The design of friction welder apparatus workpiece fitting collet 100 could include collets of various designs from any type friction welder, portable or stationary type, where such collets could hold a friction welder integral drill and fuse rotatable fitting 400 by mechanically tightening and clamping against the friction welder integral drill and fuse rotatable fitting 400, or hold the friction welder integral drill and fuse rotatable fitting 400 by threads, using friction welder integral drill and fuse rotatable fitting external threads 404, or hold the friction welder integral drill and fuse rotatable fitting 400 by means of a slip-and lock arrangement, either direct mechanical linkage or by some sort of centrifugal type clamping mechanism which tightens up against friction welder integral drill and fuse rotatable fitting 400 when rotation begins. There are many other various geometries which are designed to hold the rotatable workpiece during the friction welding process. The collet 100 is part of a friction welder apparatus and is rotated or otherwise moved to create friction, and at the same time, the collet 100 is urged toward the stationary workpiece to complete the friction welding process.

In operation, friction welder integral drill and fuse rotatable fitting 400, installed in friction welder apparatus workpiece fitting collet 100, and friction welder integral drill and fuse rotatable fitting drill bit section 408 is securely and integrally made part friction welder integral drill and fuse rotatable fitting body 405 and, thus, integral to friction welder integral drill and fuse rotatable fitting 400, and will be rotated and urged toward substrate workpiece 500, first to commence drilling the drill hole, then fusion seal against pressure or liquid, if applicable, then continue to drill the hole in substrate workpiece 500 and then to complete the friction welding process.

After the hole has been partially drilled with friction welder integral drill and fuse rotatable fitting drill bit section 408 and the friction welding process has started, on initial contact of the welding surfaces, there is a "burn-off" phase which removes foreign materials from contact area of both workpieces, (where the workpiece contact areas are defined as friction welder integral drill and fuse rotatable fitting 400, friction welder integral drill and fuse rotatable fitting fusion seal section 411, if applicable, friction welder integral drill and fuse rotatable fitting distal end 403, contact area of friction welder integral drill and fuse rotatable fitting reaction surface 406 and contact area of substrate workpiece 500). The "burn-off" phase, is immediately followed by an "upset" phase, while the drilling continues as each aforementioned contact area reaches substrate workpiece 500, with friction welder integral drill and fuse rotatable fitting drill bit section 408, and pressure sealing takes place with friction welder integral drill and fuse rotatable fitting fusion seal section 411, if applicable, prior to friction welder integral drill and fuse rotatable fitting distal end 403 breaking through the backside of substrate workpiece 500. Friction welder integral drill and fuse rotatable fitting 400 is continually urged toward substrate workpiece 500. Friction welding fusion continues in an outward radial direction, during the "upset" phase where specific defined contact areas of both workpieces are turned to a plastic condition, and there is the establishment of a flux of hot metal due to the relative rotation and high axial pressure urging the two workpieces together, caused by resistive friction between the workpieces. After automatic or operator shutdown of the rotation of the rotatable workpiece, there is a "forging" phase where axial pressure is maintained between the workpieces until plastisized material cools and the weld fuses during "fusion bonding" phase.

The friction welder will be programmed to stop or be stopped by operator intervention, so that fusion extends out to friction welder integral drill and fuse rotatable fitting peripheral edge 407, and the related contact areas of substrate workpiece 500, thereby achieving greater strengths and more even temperature strata during the friction welding process, so as to distribute greater temperature in desired fusion bonding area, so as to eliminate weak areas at the peripheral areas of the rotatable workpiece. Friction welder drill and fuse fitting apparatus 10 is now fused on substrate workpiece 500 and ready for use under this integrated embodiment.

From the foregoing description, those skilled in the art will appreciate that all of the objectives of the present invention are realized. The friction welder drill and fuse fitting apparatus 10 can be componentized as defined in the first preferred embodiment or integrally machined as described in the second preferred embodiment, Similar or dissimilar materials may be utilized to provide optimized application conditions. Prototype test results, completed by the inventor, have shown the present invention effective in combining both drilling and friction weld fusion with a friction welder drill and fuse fitting apparatus 10.

Having described the invention in detail, those skilled in the art will appreciate that modifications may be made to the invention without departing from its spirit. Therefore, it is not intended that the scope of the invention be limited to the specific embodiments, illustrated and described. Rather, it is intended that the scope of the invention be determined by the appended claims and their equivalents.

What is claimed is:

1. A fitting which enables the dual function of drilling a hole through a workpiece while being fused to said workpiece, comprising:
   a body defining a longitudinal axis and a proximal and fusible distal end defining a fusion plane, said proximal end receivable in first means to rotate said body at a given rotatable speed and while imparting a sufficient axial force between said body and the workpiece to fuse the two together about said plane; and
   the distal end of said body defining second means to cut a hole in the workpiece while said body is being fused to said workpiece where said second means extends distally below said fusion plane so as to engage said workpiece before fusion of said body to the workpiece is initiated.

2. The fitting of claim 1 where said cutting means is formed separately from said body.

3. The fitting of claim 1 where said body is provided with means to maintain said cutting means in a fixed, spaced relation about said distal end.

4. The fitting of claim 3 where said spacing means includes a set screw.

5. The fitting of claim 1 further including means to maintain a fixed relationship between said body and said rotational means.

6. The fitting of claim 5 where said means includes external threads.

7. The fitting of claim 1 were said first means includes a chuck.

8. The fitting of claim 2 further defining a bore between the distal end of the second means and the distal end of said body to enable the removal of said second means after the body is fused to the workpiece.

9. A friction welder drill and fuse fitting apparatus for creating a borehole in a workpiece and friction welding a fitting to said workpiece about said borehole comprising:
   a drill bit member having a lower drilling portion and upper mounting portion;
   a fitting member defining a lower contact end and an upper mounting portion adapted to be received by means to selectively induce rotation of said fitting about a fusion plane, where said fitting further includes an axial bore therethrough to accommodate said drill bit member and means to fix said drill bit in said bore such that rotation of said fitting at a selected rotational speed results in the rotation of said drill bit member at substantially the same rotational speed such that a borehole is created in said workpiece and said fitting is friction welded about said borehole, where said drill bit member distends below the fusion plane and engages the workpiece prior to rotation of said fitting.

10. The friction welder drill and fuse fitting apparatus of claim 9 where said rotation means comprises a friction welding machine.

11. The friction welder drill and fuse fitting apparatus of claim 9 where said drill bit and said fitting are formed from dissimilar metals.

12. The friction welder drill and fuse fitting apparatus of claim 9 where said means to fix said drill bit in said bore includes a set screw.

13. The friction welder drill and fuse fitting apparatus of claim 9 further including second means to couple said fitting to said rotation means.

14. The friction welder drill and fuse fitting apparatus of claim 13 where said second means includes a chuck.

15. A friction welder drill and fuse fitting apparatus adapted to be used with a means to impart a rotational speed and pressure to said fitting against a work surface defining a fusion plane comprising:
   a body defining a first and a fusible second end where said first end is adapted to be received in said rotational means, said body defining a longitudinal bore open at said second end; and
   means to create a hole in said work surface, said means secured in said bore and defining a cutting surface extending a selected distance from said bore and below said fusion plane such that the rotation of said fitting first creates a bole in said work surface so as to bring said second end into contact with said surface about said aperture so that it may be fictionally fused to said surface.

16. The friction welder drill and fuse fitting apparatus of claim 15 where said means to create a hole comprises a drill bit.

17. The friction welder drill and fuse fitting apparatus of claim 16 where said drill bit is formed integrally with said fitting.

18. The friction welder drill and fuse fitting apparatus of claim 15 where said drill bit is held in said fitting by a set screw.

19. The friction welder drill and fuse fitting apparatus of claim 15 where said fitting is held in said rotation means by way of a chuck.

20. The friction welder drill and fuse fitting apparatus of claim 15 where said body defines external threads.

21. The friction welder drill and fuse fitting apparatus of claim 20 where said body is receivable in an adapter which in turn is engagable by said rotation means.

* * * * *